(No Model.)
L. BRICKER.
PLANT PROTECTOR.
No. 499,203. Patented June 13, 1893.
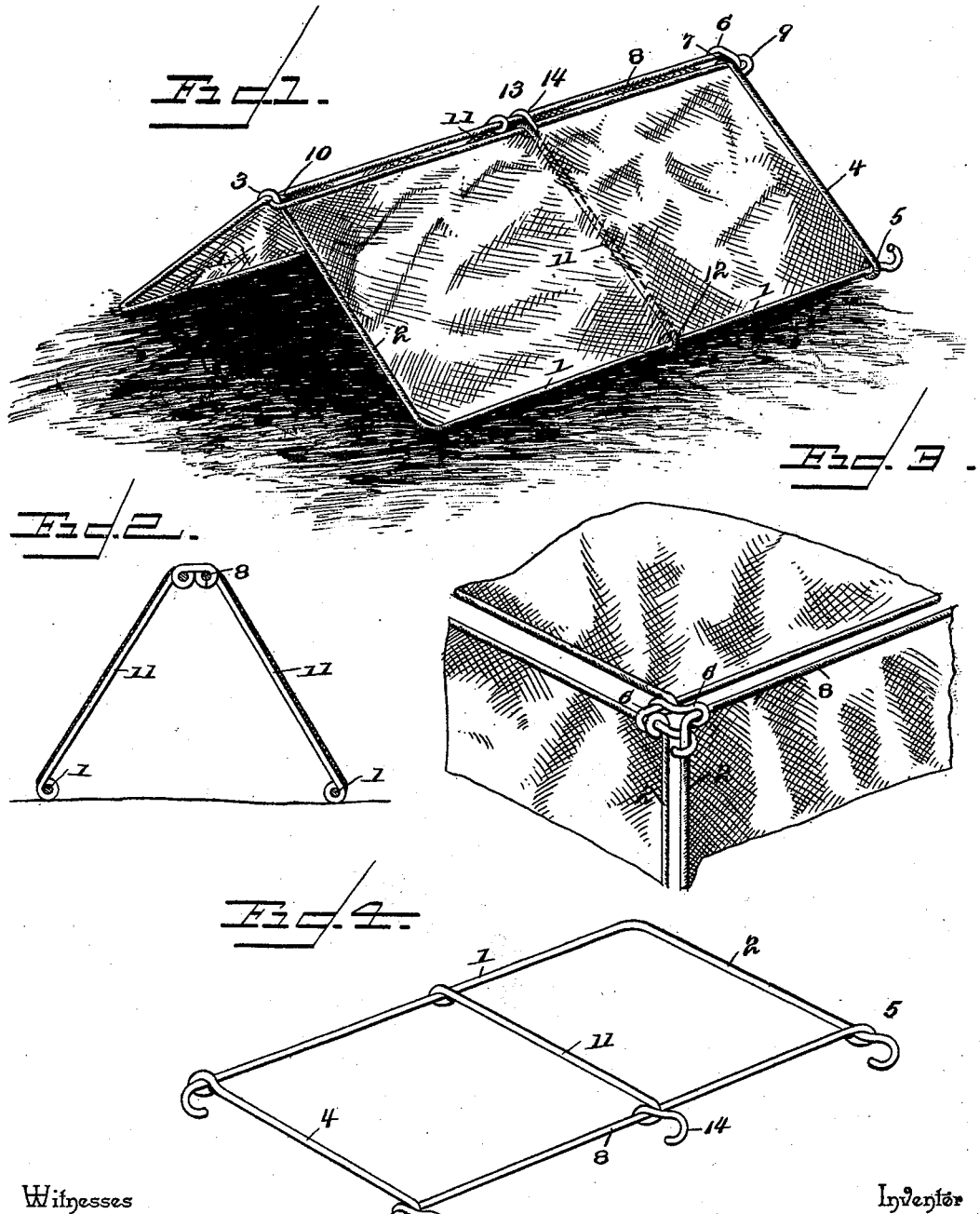
Witnesses
E. K. Stewart
J. H. Siggers
Inventor
Leonard Bricker,
By his Attorneys,
C. A. Snow & Co.

UNITED STATES PATENT OFFICE.

LEONARD BRICKER, OF ST. LOUIS, MISSOURI.

PLANT-PROTECTOR.

SPECIFICATION forming part of Letters Patent No. 499,203, dated June 13, 1893.

Application filed November 7, 1892. Serial No. 451,205. (No model.)

*To all whom it may concern:*

Be it known that I, LEONARD BRICKER, a citizen of the United States, residing at St. Louis, in the State of Missouri, have invented a new and useful Plant-Protector, of which the following is a specification.

My invention relates to improvements in plant-protectors, the objects in view being to provide a cheap and simple construction of protector that may be converted into various forms for the purpose of protecting the plants from premature frosts, and which at the same time will be light, inexpensive, portable, readily assembled, and capable of being transformed into various shapes, and withal to permit of a circulation of air around the plant as well as to admit sunlight.

With these objects in view, the invention consists in a series of sections formed of light wire and covered with suitable material, (preferably something cheap in the nature of cheese-cloth,) whereby air and sunlight may enter and frost be excluded; and further to so construct these sections as to render them detachable and capable of being assembled in various relations whereby different kinds of structures may be produced.

In the drawings:—Figure 1 illustrates a protector in one of its simplest forms, the same being constructed in accordance with my invention. Fig. 2 is a transverse vertical view of the same. Fig. 3 is a detail in perspective of two adjacent sections as they are connected for forming a rectangular protector. Fig. 4 is a detail in perspective of one of the protector sections.

Like numerals of reference indicate like parts in all the figures of the drawings.

In constructing the sections I employ preferably light spring-wire, though aluminum, copper, or other metal may be substituted. I take a section of such wire and bend one-third of the same at a right angle to its remaining portion and form a horizontal or lower base-portion 1, and a vertical-portion 2, and these extremities are bent to form hooks 3. To the base portion 1 adjacent to the hook 3, I secure a vertical end-portion 4, the same being bent around the portion 1 adjacent to the hook and soldered, all as indicated at 5. The upper end of this end portion 4 is bent to form the hook 6, corresponding to the hook 3 of the portion 1, and below this hook it is coiled to form an eye 7. Through the eye 7, is passed the upper portion 8, the same having its extremity beyond the eye bent to form a hook 9, and its opposite end coiled to form an eye 10, which encircles the vertical-portion 2 immediately below its hook 3, at which point it is soldered, as it is also at the eye 7.

A central vertical-portion 11, has its lower extremity coiled about the base 1 and soldered at 12, and near its upper end is coiled about the upper portion 8, at the center as indicated at 13, and above this point is bent to form a hook 14 which is in line with the hook 3. Thus it will be seen that the upper edge of the section is provided with a series of three hooks, while one end thereof is provided with two hooks, the remaining end and bottom portion being plain. Now by engaging the end hooks with the plain ends of the adjacent section, and so on continuously, it will be seen that a rectangular-frame may be formed, after which by superimposing a pair of sections and engaging their hooks with the upper portions of the side-walls a closed protector is produced. These sections are all covered with some light material, designated as 15, which will permit of a circulation of air and an admission of sunshine and light, and yet will exclude frost, so that the plants remain unaffected by premature frosts. Various other shapes may be given the protectors, such for instance as that shown in Fig. 1, wherein two sections are connected by means of the hooks of one section at its upper side engaging with the upper edge of the remaining section.

From the foregoing description in connection with the accompanying drawings it will be seen that I have provided a protector capable of assuming many shapes and adapting it to various plants, the same being so constructed as to be durable and efficient, whose covering may be readily replaced when worn, the frames being used over and over again from one season to another.

Having described my invention, what I claim is—

1. A plant protector, comprising a series of wire frames having a covering, said frames having their ends terminating in hooks whereby they may engage adjacent frames in a detachable manner, substantially as specified.

2. A plant protector, comprising opposite rectangular sections formed of wire having covers and provided at their meeting edges with hooks removably engaging each other and forming opposite inclined walls, substantially as specified.

3. A section for a plant protector, the same consisting of a rectangular wire frame, two of the ends and one side of which are provided with a series of hooks for removably engaging similar sections, and covers for said frames, substantially as specified.

4. The herein described section for plant protectors, the same consisting of a piece of wire having one-third bent upward to form one end and terminating in a hook and its opposite end extending horizontally and terminating in a hook, a straight end-piece having an eye engaging the horizontal-portion adjacent to the hook and soldered thereto and terminating at its upper end in a hook and below the same provided with an eye, a horizontal piece passed through the eye and terminating at one side of the eye in a hook and having its opposite end bent to form an eye for engaging the opposite end-portion, and a central-portion coiled at its lower end to engage the horizontal portion and at its upper end to engage the upper horizontal portion and soldered at these points, and above the latter point bent to form a hook, substantially as specified.

In testimony that I claim the foregoing as my own I have hereto affixed my signature in the presence of two witnesses.

LEONARD BRICKER.

Witnesses:
GEO. F. HAID,
A. E. HAID.